United States Patent
Tang et al.

(10) Patent No.: US 9,104,216 B2
(45) Date of Patent: Aug. 11, 2015

(54) MIXED MODE COMPENSATION CIRCUIT AND METHOD FOR A POWER CONVERTER

(71) Applicant: Richtek Technology Corporation, Chupei, Hsinchu (TW)

(72) Inventors: Chien-Fu Tang, Hsinchu (TW); Jiun-Hung Pan, Taipei (TW); Isaac Y. Chen, Hsinchu County (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 391 days.

(21) Appl. No.: 13/672,125

(22) Filed: Nov. 8, 2012

(65) Prior Publication Data

US 2013/0113450 A1 May 9, 2013

(30) Foreign Application Priority Data

Nov. 8, 2011 (TW) .............................. 100140680 A

(51) Int. Cl.
  *G05F 1/00* (2006.01)
  *G05F 1/10* (2006.01)

(52) U.S. Cl.
  CPC *G05F 1/10* (2013.01); *Y02B 70/126* (2013.01)

(58) Field of Classification Search
  CPC .............. G05F 1/10; G05F 1/46; G05F 1/625
  USPC .................................. 323/282, 283, 285, 286
  See application file for complete search history.

(56) References Cited

U.S. PATENT DOCUMENTS

| | | | | |
|---|---|---|---|---|
| 6,100,827 A | * | 8/2000 | Boesch et al. | 341/118 |
| 6,215,433 B1 | * | 4/2001 | Sonu et al. | 341/155 |
| 7,589,983 B1 | * | 9/2009 | Lin et al. | 363/21.13 |
| 2013/0049713 A1 | * | 2/2013 | Ogawa et al. | 323/234 |

\* cited by examiner

*Primary Examiner* — Matthew Nguyen
(74) *Attorney, Agent, or Firm* — Tung & Associates

(57) ABSTRACT

A mixed mode compensation circuit and method for a power converter generate a digital signal according to a reference value and a feedback signal which is related to the output voltage of the power converter, convert the digital signal into a first analog signal, offset the first analog signal with a variable offset value to generate a second analog signal, and filter out high-frequency components of the second analog signal to generate a third analog signal for stable output voltage of the power converter. The mixed mode compensation does not require large capacitors, and thus the circuit can be integrated into an integrated circuit.

31 Claims, 11 Drawing Sheets

20

MIXED MODE COMPENSATION CIRCUIT AND METHOD FOR A POWER CONVERTER

FIELD OF THE INVENTION

The present invention is related generally to a power converter and, more particularly, to a compensation circuit and method for a power converter.

BACKGROUND OF THE INVENTION

A feedback loop of a power converter needs a compensation circuit to compensate the phase margin for stability of the feedback loop. Conventional analog compensation circuits include an EA type compensation circuit 10 as shown in FIG. 1 or a gm type compensation circuit 14 as shown in FIG. 2. Referring to FIG. 1, the EA type compensation circuit 10 includes an error amplifier 12, a capacitor C1 and a resistor R3 serially connected between an inverting input terminal and an output terminal of the error amplifier 12, and a resistor R4 parallel connected with the serially connected capacitor C1 and resistor R3. The error amplifier 12 amplifies the difference between a feedback signal Vfb and a reference value Vref to generate a signal Vcomp which is then provided to a power converter to stabilize the output voltage V0 of the power converter. The resistors R3 and R4 and the capacitor C1 are configured to compensate the signal Vcomp. Some applications may not include the resistor R4 shown in FIG. 1. Referring to FIG. 2, the gm type compensation circuit 14 includes a transconductance amplifier 16, a resistor R3 and a capacitor C1 serially connected between an output terminal of the transconductance amplifier 16 and a ground terminal GND, and a capacitor C2 parallel connected with the serially connected resistor R3 and capacitor C1. The transconductance amplifier 16 converts the difference between a feedback signal Vfb and a reference value Vref into a current Icomp. The resistor R3 and the capacitors C1 and C2 are configured to generate a compensation signal Vcomp according to the current Icomp. For a control integrated circuit (IC), using an external compensation circuit requires a pin of the control IC. In order to reduce the number of the pins of a control IC, more and more solutions integrate a compensation circuit into a control IC, for example, U.S. Pat. No. 7,504,888. Generally speaking, the gm type compensation circuit 14 is easier to be integrated into a control IC, while this type of solutions also has many limitations. Generally, a control IC for a high switching frequency DC/DC power converter has a pole and a zero point that are both higher than 10 KHz, so it is easier to integrate the compensation circuit into the control IC. However, in low-bandwidth applications such as power factor correction (PFC) power converters or other similar PFC control ICs or power converters, the compensation circuit 14 requires large capacitors C1 and C2. Under consideration of costs and chip area, it is much difficult to integrate the large capacitors C1 and C2 into the control IC completely. More specifically, the input voltage of a PFC power converter is an alternating-current (AC) voltage with an AC frequency of 60 Hz, so a control IC needs a low gain and a pole and a zero point of a low frequency to achieve a low-bandwidth loop to filter out the AC frequency. Therefore, the compensation circuit 14 requires large capacitors C1 and C2 for compensation to make the signal Vcomp vary slowly so as to filter out the AC frequency. However, the large capacitors C1 and C2 satisfying the requirements cannot be implemented in a control IC, the control IC is required a pin to be connected to external large capacitors C1 and C2. If it is desired to shrink the capacitors C1 and C2 so that they can be integrated into a control IC, then it needs the current Icomp to be reduced to the nanoampere level or the picoampere level; however, such a small current is much sensitive to the process and cannot be controlled accurately, so it is difficult to integrate the large capacitors C1 and C2 into a control IC.

Since it is difficult to integrate an analog compensation circuit into a control IC, many digital compensation circuits are proposed, for example, U.S. Pat. Nos. 7,743,266 and 7,894,218. Although these digital compensation circuits can be integrated into the control IC of a PFC power converter, usually a complex digital signal processing (DSP) algorithm is needed and thus a large chip area is required, resulting in increased costs and chip size. On the other hand, the slowly varying signal Vcomp will make a power converter unable to rapidly respond to a load transient, resulting in a large voltage drop or overshoot of the output voltage Vo.

SUMMARY OF THE INVENTION

An objective of the present invention is to provide a mixed mode compensation circuit that combines an analog circuit and a digital circuit together, and a mixed mode compensation method thereof.

Another objective of the present invention is to provide a mixed mode compensation circuit that is integrated into an IC to reduce the number of pins, and a mixed mode compensation method thereof.

Yet another objective of the present invention is to provide a mixed mode compensation circuit that can reduce the chip area and the costs.

Still another objective of the present invention is to provide a mixed mode compensation circuit and a mixed mode compensation method for improving a load transient of a power converter.

A further objective of the present invention is to provide a mixed mode compensation circuit that has two poles and a zero point.

According to the present invention, a mixed mode compensation circuit for a power converter includes a digital signal generator to generate a digital signal according to a reference value and a feedback signal which is related to an output voltage of the power converter, a digital-to-analog converter to convert the digital signal into a first analog signal, an offset injector to offset the first analog signal according to a variable offset value to generate a second analog signal, and a low-pass filter to filter out high-frequency components of the second analog signal to generate a third analog signal for the power converter to stabilize the output voltage.

According to the present invention, a mixed mode compensation method for a power converter includes generating a digital signal according to a reference value and a feedback signal which is related to an output voltage of the power converter, converting the digital signal into a first analog signal, providing a variable offset value varying with the difference between the feedback signal and the reference value, offsetting the first analog signal with the variable offset value to generate a second analog signal, and filtering out high-frequency components of the second analog signal to generate a third analog signal for the power converter to stabilize the output voltage.

The digital signal generator and the digital-to-analog converter provide a first pole, the offset injector provides a zero point, and the low-pass filter provides a second pole. In this way, the mixed mode compensation circuit can simulate the function of an analog compensation circuit, and thus can replace an analog compensation circuit. Moreover, the mixed mode compensation circuit need not use large capacitors, so it can be easily integrated into a control IC of the power converter, thereby reducing the number of pins of the control IC.

Due to combining an analog circuit and a digital circuit together, a mixed mode compensation circuit according to the present invention is simple and doesn't need a complex DSP algorithm as compared to a digital mode compensation circuit, thereby reducing the chip area and the costs.

When a load transient occurs to a power converter, a mixed mode compensation circuit according to the present invention can increase the digital signal to a maximum value or decrease the digital signal to a minimum value immediately, or increase or decrease the digital signal at a maximum frequency. Therefore, the load transient response can be improved.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
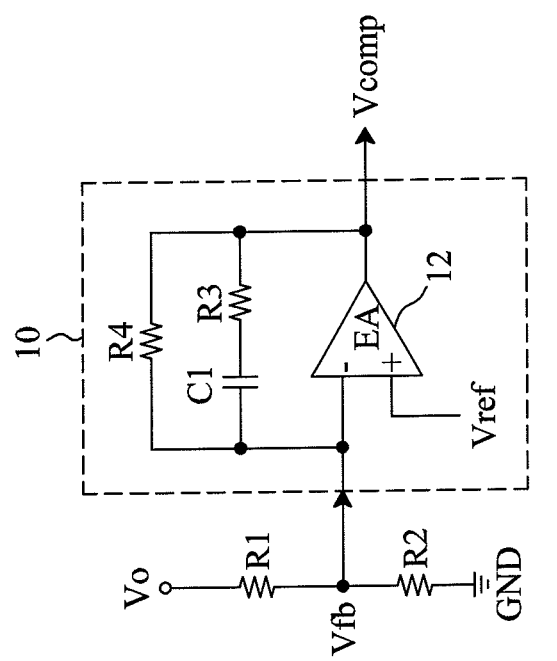
FIG. 1 is a circuit diagram of a conventional EA type compensation circuit.
Figure 2:
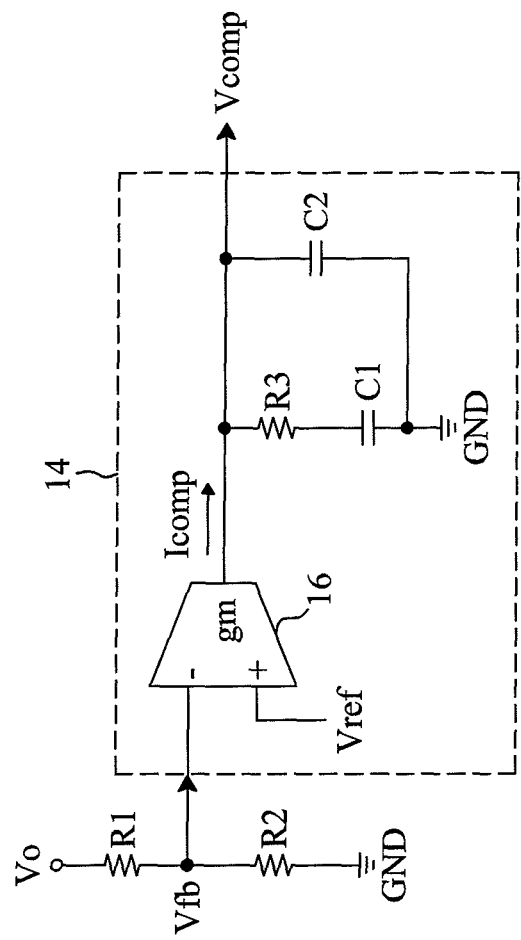
FIG. 2 is a circuit diagram of a conventional gm type compensation circuit.
Figure 3:
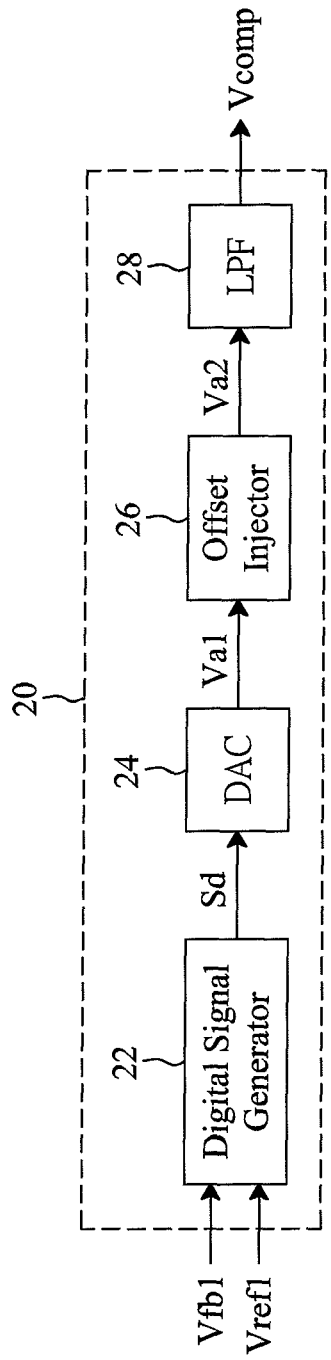
FIG. 3 shows a mixed mode compensation circuit according to the present invention.

Referring to FIG. 3, a mixed mode compensation circuit 20 according to the present invention is applicable to various types of power converters such as a DC/DC power converter and a PFC power converter. In the mixed mode compensation circuit 20, a digital signal generator 22 generates a digital signal Sd according to a reference value Vref1 and a feedback signal Vfb1 related to the output voltage of a power converter, a digital-to-analog converter (DAC) 24 converts the digital signal Sd into a first signal Va1 which is an analog signal, an offset injector 26 provides a variable offset value to offset the first signal Va1 to generate a second signal Va2 which is also an analog signal, and a low-pass filter (LPF) 28 filters out the high-frequency components of the second signal Va2 to generate a third signal Vcomp which is then provided to stabilize the output voltage of the power converter. The mixed mode compensation circuit 20 simulates the gm type compensation circuit 14 shown in FIG. 2. As is well known, the gm type compensation circuit 14 provides two poles and a zero point, and the mixed mode compensation circuit 20 can also provide two poles and a zero point. In detail, the digital signal generator 22 and the DAC 24 may be viewed as a first pole generator for providing a first pole, the offset injector 26 may be viewed as a zero point generator for providing a zero point, and the LPF 28 may be viewed as a second pole generator for providing a second pole.

Figure 4:
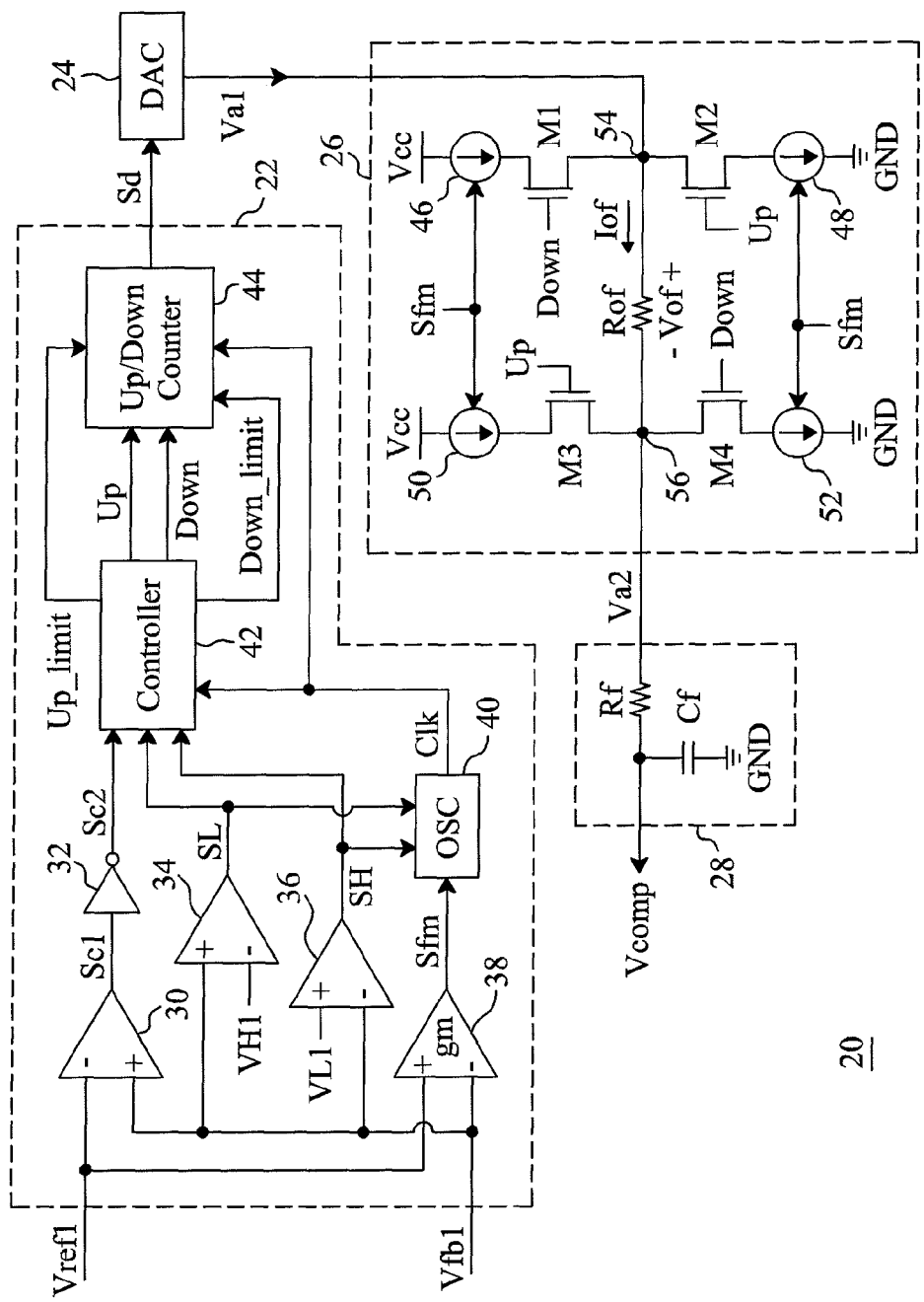
FIG. 4 is a circuit diagram of a first embodiment for the mixed mode compensation circuit shown in FIG. 3.

FIG. 4 is a circuit diagram of a first embodiment for the mixed mode compensation circuit 20 shown in FIG. 3. In order to realize the first pole of a low frequency, the digital signal generator 22 and the DAC 24 are used to simulate the transconductance amplifier 16 of the gm type compensation circuit 14 shown in FIG. 2. In the digital signal generator 22 shown in FIG. 4, a comparator 30 compares the feedback signal Vfb1 with the reference value Vref1 to generate a comparison signal Sc1, an inverter 32 inverts the comparison signal Sc1 to generate a signal Sc2 for a controller 42, an oscillator 40 provides a clock signal Clk for the controller 42 and an up/down counter 44, and the controller 42 samples the signal Sc2 responsive to the clock signal Clk to assert control signals Up and Down for the up/down counter 44 to adjust the digital signal Sd. When the sampling result indicates that the feedback signal Vfb1 is greater than the reference value Vref1, the controller 42 asserts the control signal Down to signal the up/down counter 44 to decrease the digital signal Sd by one bit so as to decrease the output power of the power converter. When the sampling result indicates that the feedback signal Vfb1 is smaller than the reference value Vref1, the controller 42 asserts the control signal Up to signal the up/down counter 44 to increase the digital signal Sd by one bit so as to increase the output power of the power converter. The up/down counter 44 samples the control signals Up and Down from the controller 42 responsive to the clock signal Clk to adjust the digital signal Sd. The DAC 24 converts the digital signal Sd into the first analog signal Va1. The DAC 24 is a relatively common circuit, and thus the internal circuit and operations thereof will not be further described herein. When the clock signal Clk is at a low frequency, the sampling frequency is relatively low and the digital signal Sd varies slowly, which makes the third analog signal Vcomp outputted by the mixed mode compensation circuit 20 vary slowly. This effect is the same as that in the case where the gm type compensation circuit 14 uses large capacitors C1 and C2.

If the third analog signal Vcomp outputted by the mixed mode compensation circuit 20 still varies slowly when a load transient occurs to the power converter, then the power converter cannot make a response rapidly, causing the output voltage V0 of the power converter to have a large voltage drop or overshoot. For this issue, the digital signal generator 22 shown in FIG. 4 further includes a hysteresis comparator 34 to compare the feedback signal Vfb1 with a threshold VH1 to generate a comparison signal SH for the controller 42, a hysteresis comparator 36 to compare the feedback signal Vfb1 with a threshold VL1 to generate a comparison signal SL for the controller 42, and an operational transconductance amplifier 38 to amplify the difference ΔV between the feedback signal Vfb1 and the reference value Vref1 to generate a frequency adjustment signal Sfm which is then provided to the oscillator 40 to adjust the frequency of the clock signal Clk. When the difference ΔV between the feedback signal Vfb1 and the reference value Vref1 increases, the frequency adjustment signal Sfm will increase the frequency of the clock signal Clk to increase the sampling frequency so as to speed up the variation of the digital signal Sd and the slew rate of the third analog signal Vcomp. When the feedback signal Vfb1 is greater than the threshold VH 1 or smaller than the threshold VL1, the hysteresis comparator 34 or 36 asserts the comparison signal SL or SH for the oscillator 40 to increase the frequency of the clock signal Clk to a maximum value such that the digital signal Sd is increased or decreased at a maximum frequency. Furthermore, when the feedback signal Vfb1 is greater than the threshold VH1, the controller 42 responsive to the comparison signal SL asserts a control signal Down_limit for the up/down counter 44 such that the up/down counter 44 decreases the digital signal Sd to a minimum value at the maximum frequency to thereby increase the slew rate of the third analog signal Vcomp, thus rapidly reducing the output power of the power converter and rapidly reducing the output voltage V0 of the power converter to a preset level. Likewise, when the feedback signal Vfb1 is smaller than the threshold VL1, the controller 42 responsive to the comparison signal SH asserts a control signal Up_limit for the up/down counter 44 such that the up/down counter 44 increases the digital signal Sd to a maximum value at the maximum frequency to thereby increase the slew rate of the third analog signal Vcomp, thus rapidly increasing the output power of the power converter and rapidly increasing the output voltage V0 of the power converter to the preset level. In other embodiments, when the feedback signal Vfb1 is greater than the threshold VH1 or smaller than the threshold VL1, the up/down counter 44 can also adjust the digital signal Sd responsive to the comparison signal SL or SH to the minimum value or the maximum value immediately. When a load transient occurs, the difference ΔV between the feedback signal Vfb1 and the reference value Vref1 increases, so the sampling frequency of the controller 42 and the up/down counter 44 is increased to thereby increase the slew rate of the third analog signal Vcomp. Moreover, when the feedback signal Vfb1 is greater than the threshold VH1 or smaller than the threshold VL1, the digital signal Sd can be decreased to the minimum value or increased to the maximum value immediately or at the maximum frequency, so the load transient response of the power converter can be improved effectively.

Figure 5:
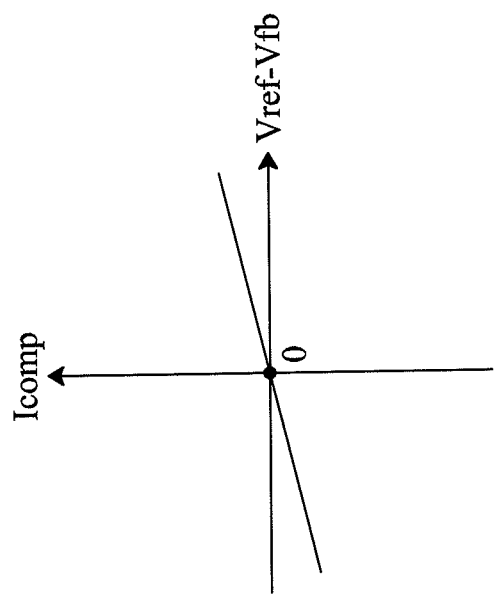
FIG. 5 is a current-voltage characteristic curve of the transconductance amplifier shown in FIG. 2.

FIG. 5 is a current-voltage characteristic curve of the transconductance amplifier 16 shown in FIG. 2. From the circuit shown in FIG. 2, it may have $$Ce \times Vcomp = Icomp \times T,  \quad [EQ-1]$$

where Ce is the equivalent capacitance of the capacitors C1 and C2, and T is the duration that the current Icomp is asserted. From the equation EQ-1, it is further derived $$Icomp/Ce = Vcomp/T.  \quad [EQ-2]$$

Figure 6:
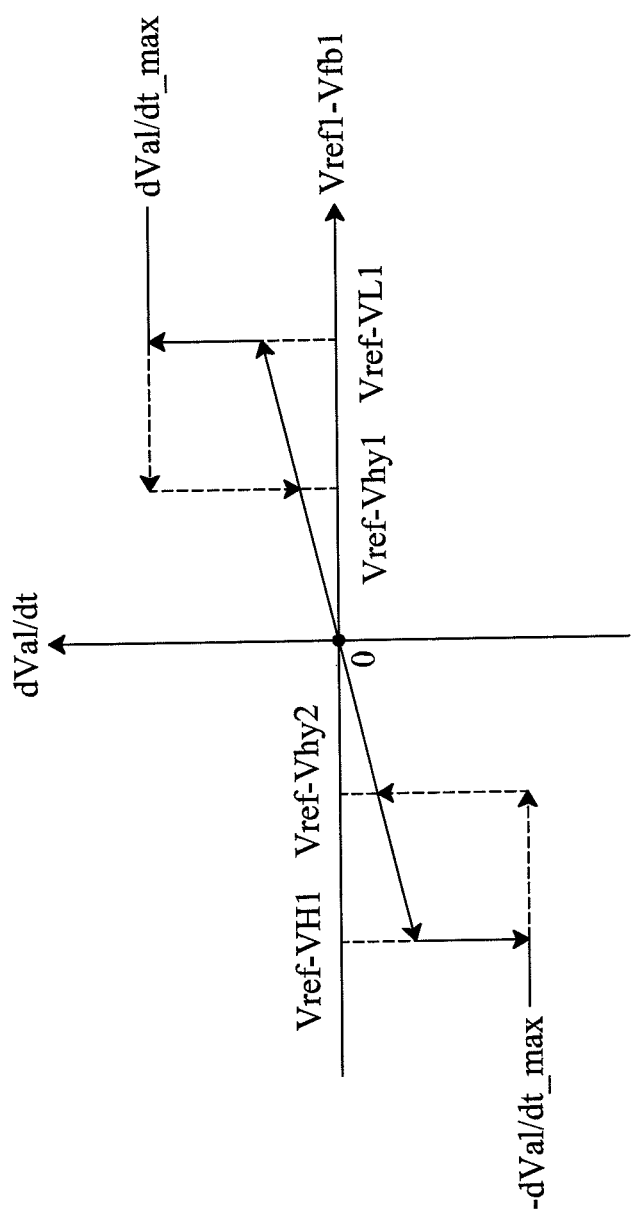
FIG. 6 is a characteristic curve of the voltage variation rate dVa1/dt of the first signal Va1 shown in FIG. 4 versus the voltage Vref1-Vfb1.

As can be known from the equation EQ-2, because the current Icomp and the capacitance Ce determine the voltage variation rate dVcomp/dt and the capacitance Ce is a constant value, the current Icomp is directly proportional to the voltage variation rate dVcomp/dt. Therefore, the Y axis in FIG. 5 may also be viewed to represent the voltage variation rate dVcomp/dt. The digital signal generator 22 and the DAC 24 shown in FIG. 3 that simulate the transconductance amplifier 16 can also achieve a similar voltage variation rate. For example, FIG. 6 is a characteristic curve of the voltage variation rate dVa1/dt (i.e., the slew rate) of the first signal Va1 of the DAC 24 shown in FIG. 4 versus the input voltage Vfb1 of the digital signal generator 22. A part of this curve between the thresholds VL1 and VH1 is the same as the curve shown in FIG. 5, and there are hysteresis regions at two ends of this curve. When the feedback signal Vfb1 is increased to be greater than the threshold VH1, the digital signal Sd is decreased at the maximum sampling frequency, so the first signal Va1 has a maximum negative voltage variation rate $-dVa1/dt\_max$ and the voltage variation rate $dVa1/dt$ of the first signal Va1 will not return to the original level until the feedback signal Vfb1 is decreased to be smaller than a hysteresis threshold Vhy1. Likewise, when the feedback signal Vfb1 is decreased to be smaller than the threshold VL1, the digital signal Sd is increased at the maximum frequency of the clock signal Clk, so the first signal Va1 has a maximum positive voltage variation rate $dVa1/dt\_max$ and the voltage variation rate $dVa1/dt$ of the first signal Va1 will not return to the original level until the feedback signal Vfb1 is increased to be greater than a hysteresis threshold Vhy2.

In the embodiment shown in FIG. 4, the offset injector 26 includes a current source 46 and a switch M1 connected in series between a power terminal Vcc and a first terminal 54 of a resistor Rof, a current source 48 and a switch M2 connected in series between the first terminal 54 of the resistor Rof and a ground terminal GND, a current source 50 and a switch M3 connected in series between the power terminal Vcc and a second terminal 56 of the resistor Rof, and a current source 52 and a switch M4 connected in series between the second terminal 56 of the resistor Rof and the ground terminal GND. The switches M1 and M4 are controlled by the control signal Down from the controller 42, and the switches M2 and M3 are controlled by the control signal Up from the controller 42. Controlling the switches M1, M2, M3 and M4 may determine the direction of the current Iof of the resistor Rof. The current sources 46, 48, 50 and 52 determine the magnitude of the current Iof according to the frequency adjustment signal Sfm from the operational transconductance amplifier 38 so as to determine a variable offset value V of for offsetting the first signal Va1 to generate the second signal Va2. Because the frequency adjustment signal Sfm is associated with the difference ΔV between the feedback signal Vfb1 and the reference value Vref1, the variable offset value V of also varies with the difference ΔV. In other embodiments, the current sources 46, 48, 50 and 52 may also determine the current Iof according to other signals associated with the difference ΔV instead. The low-pass filter 28 shown in FIG. 4 includes an RC filter established by a resistor Rf and a capacitor Cf, and filters the second signal Va2 to generate the third signal Vcomp. From the viewpoint of physical significance of the control loop, the zero point of the gm type compensation circuit 14 serves as a phase lead compensation and the second pole is similar to a low-pass filter, so the mixed mode compensation circuit 20 of the present invention uses the offset injector 44 to provide an instantaneous voltage variation to simulate the function of the zero point and uses the RC filter to achieve the second pole.

Figure 7:
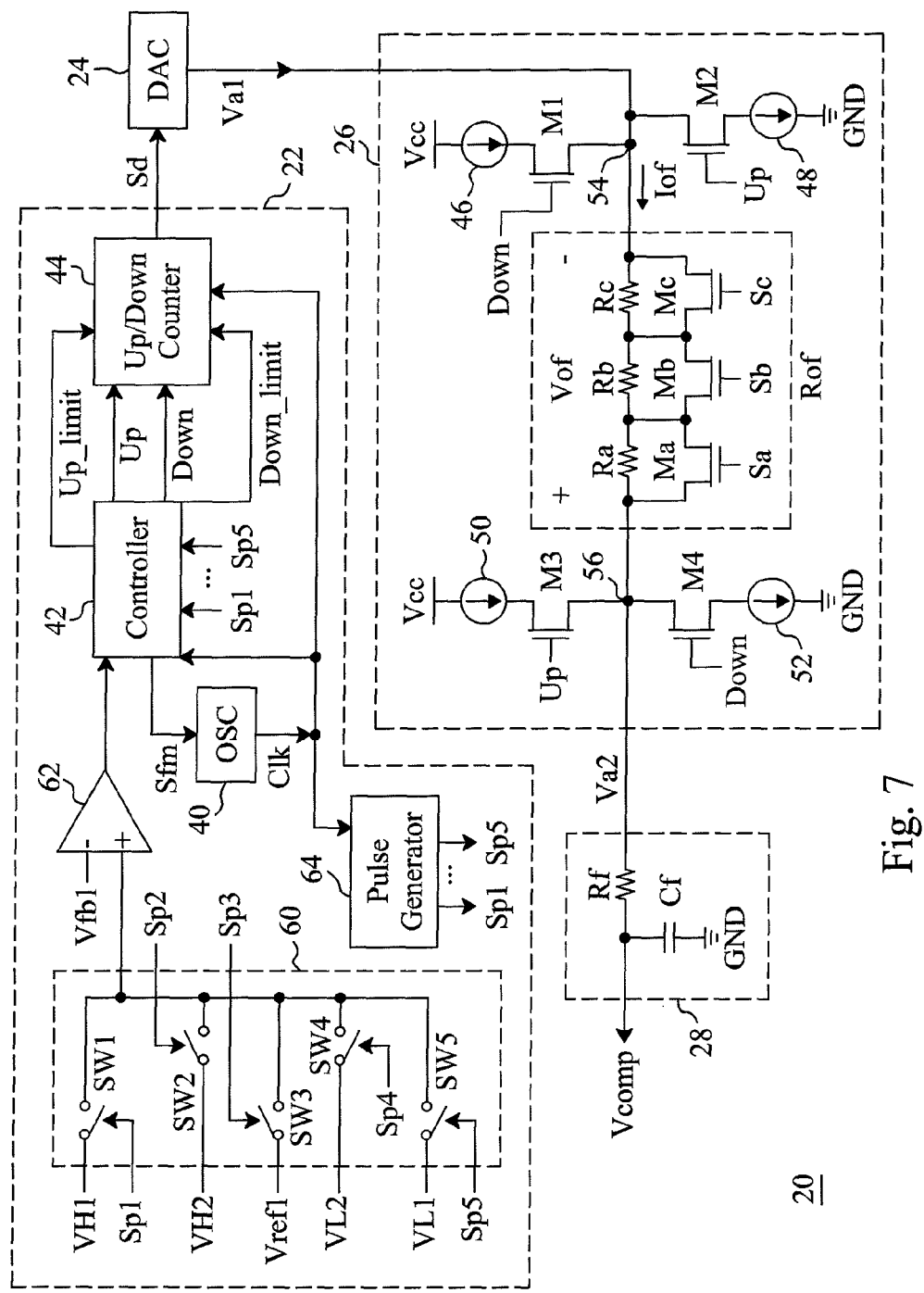
FIG. 7 is a circuit diagram of a second embodiment for the mixed mode compensation circuit shown in FIG. 3.
Figure 8:
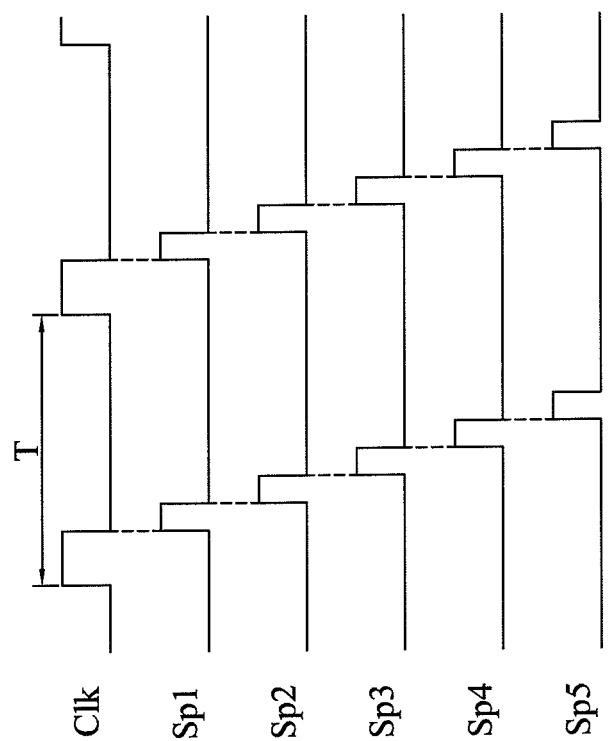
FIG. 8 is a timing diagram of the clock signal and pulse signals shown in FIG. 7.

FIG. 7 is a circuit diagram of a second embodiment for the mixed mode compensation circuit 20 shown in FIG. 3. In the digital signal generator 22, a multiplexer 60 is configured to switch a threshold VH1, a threshold VH2, the reference value Vref1, a threshold VL2 and a threshold VL1 in turn to a non-inverting input terminal of a comparator 62 responsive to pulse signals Sp1-Sp5, respectively, where VH1>VH2>Vref1>VL2>VL1, the comparator 62 has an inverting input terminal to receive the feedback signal Vfb1 and compares the feedback signal Vfb1 with VH1, VH2, Vref1, VL1 and VL2 one by one to generate a comparison signal for the controller 42, and the controller 42 samples the comparison signal from the comparator 62 responsive to a clock signal Clk and the pulse signals Sp1-Sp5, and asserts control signals Up and Down for the up/down counter 44 according to the sampling result so as to increase or decrease the digital signal Sd. The controller 42 also identifies whether the feedback signal Vfb1 is greater than the maximum threshold VH1 or smaller than the minimum threshold VL1 according to the comparison results of the comparator 62. If the feedback signal Vfb1 is greater than the maximum threshold VH1, then the controller 42 asserts a control signal Down_limit such that the up/down counter 44 decreases the digital signal Sd to a minimum value immediately or at a maximum frequency so as to increase the slew rate of the third analog signal Vcomp. If the feedback signal Vfb1 is smaller than the minimum threshold VL1, then the controller 42 asserts a control signal Up_limit such that the up/down counter 44 increases the digital signal Sd to a maximum value immediately or at the maximum frequency so as to increase the slew rate of the third analog signal Vcomp. The controller 42 also provides a frequency adjustment signal Sfm for the oscillator 40 according to the comparison result of the comparator 62 to adjust the frequency of the clock signal Clk. The greater the difference between the feedback signal Vfb1 and the reference value Vref1 is, the higher the frequency of the clock signal Clk will be, and this can increase the slew rate of the third analog signal Vcomp and speed up the load transient response. When the feedback signal Vfb1 is greater than the maximum threshold VH1 or smaller than the minimum threshold VL1, the frequency of the clock signal Clk will be increased to a maximum value by the frequency adjustment signal Sfm to increase the sampling frequency of the controller 42 and the up/down counter 44. A pulse generator 64 generates the pulse signals Sp1-Sp5 as shown in FIG. 8 responsive to the clock signal Clk, and provides the pulse signals Sp1-Sp5 to the multiplexer 60 in turn in each period T of the clock signal Clk.

In the offset injector 26 shown in FIG. 7, the resistor Rof in FIG. 4 is replaced by a variable resistor controlled by a switch, and the resistance of the variable resistor varies with the difference ΔV between the feedback signal Vfb1 and the reference value Vref1. The current sources 46, 48, 50 and 52 supply fixed currents, so the current Iof passing through the variable resistor Rof is constant. In this embodiment, the variable resistor Rof includes three resistors Ra, Rb and Rc connected in series, and the resistors Ra, Rb and Rc are connected in parallel with switches Ma, Mb and Mc, respectively. Signals Sa, Sb and Sc generated according to the difference ΔV control the switches Ma, Mb and Mc, respectively, to adjust the resistance of the variable resistor Rof, thereby generating the variable offset value V of varying with the difference ΔV for offsetting the first signal Va1 to generate the second signal Vat.

Figure 9:
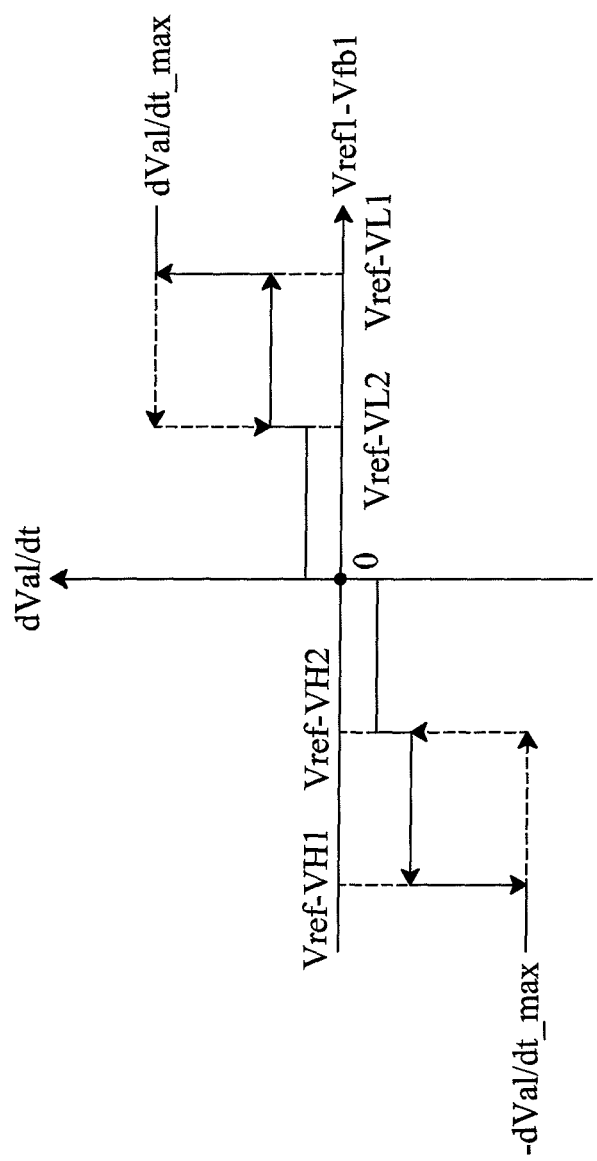
FIG. 9 is a characteristic curve of the voltage variation rate dVa1/dt of the first signal Va1 shown in FIG. 7 versus the voltage Vref1-Vfb1.

FIG. 9 is a characteristic curve of the voltage variation rate dVa1/dt of the first signal Va1 of the DAC 24 shown in FIG. 7 versus the input voltage Vfb1 of the digital signal generator 22. When the feedback signal Vfb1 is increased to be greater than the threshold VH1, the digital signal Sd is decreased at the maximum frequency, so the first signal Va1 has a maximum negative voltage variation rate −dVa1/dt_max and the voltage variation rate of the first signal Va1 will not return to the original level until the feedback signal Vfb1 is decreased to be smaller than the threshold VH2. Likewise, when the feedback signal Vfb1 is decreased to be smaller than the threshold VL1, the digital signal Sd is increased at the maximum frequency, so the first signal Va1 has a maximum positive voltage variation rate dVa1/dt_max and the variation rate of the first signal Va1 will not return to the original level until the feedback signal Vfb1 is increased to be greater than the hysteresis threshold VL2. In the embodiment shown in FIG. 7, as the number of the thresholds that are set increases, the curve of FIG. 9 approaches the curve of FIG. 6.

Figure 10:
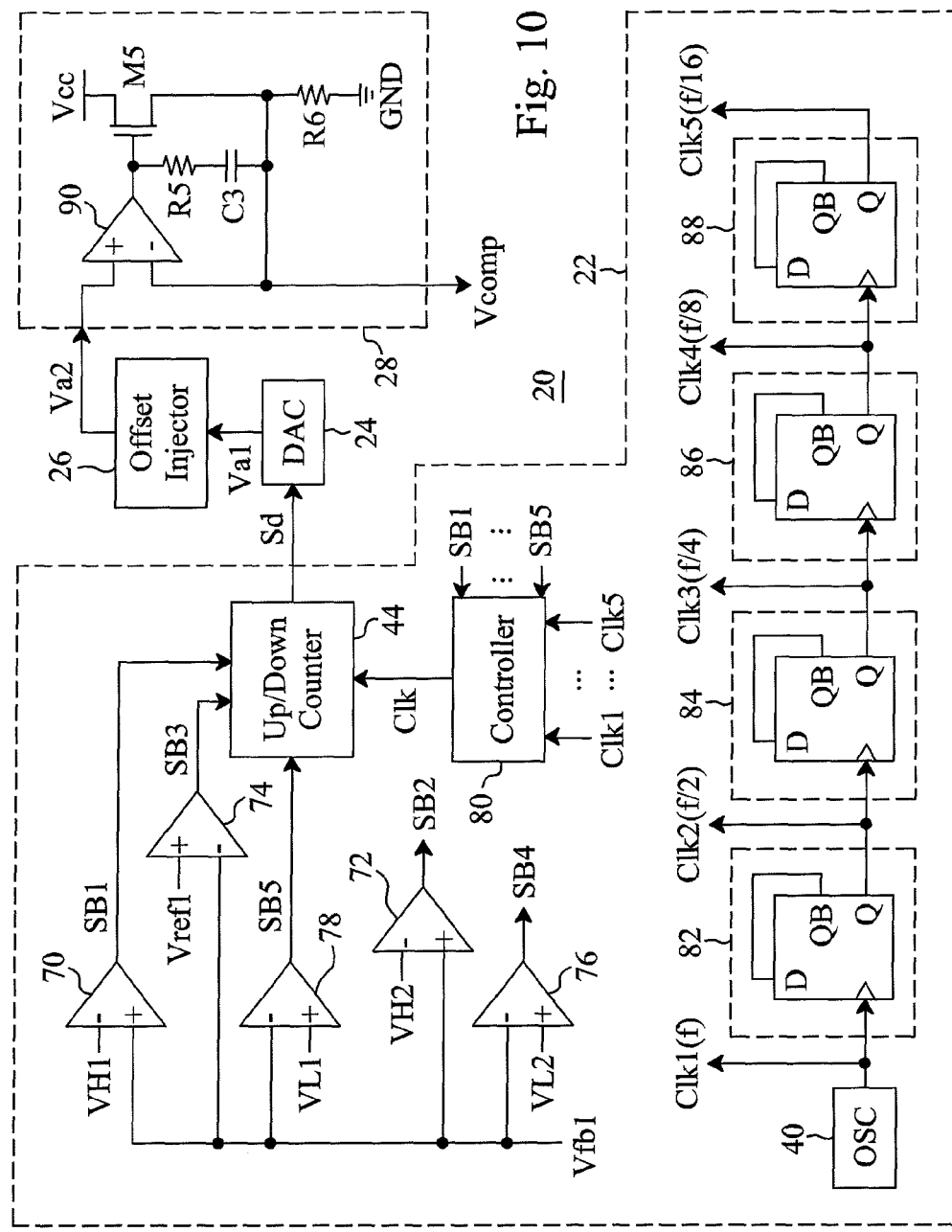
FIG. 10 is a circuit diagram of a third embodiment for the mixed mode compensation circuit shown in FIG. 3.

FIG. 10 is a circuit diagram of a third embodiment for the mixed mode compensation circuit 20 shown in FIG. 3. In the digital signal generator 22, a comparator 70 compares the feedback signal Vfb1 with a threshold VH1 to generate a comparison signal SB1, a comparator 72 compares the feedback signal Vfb1 with a threshold VH2 to generate a comparison signal SB2, a comparator 74 compares the feedback signal Vfb1 with the reference value Vref1 to generate a comparison signal SB3, a comparator 76 compares the feedback signal Vfb1 with a threshold VL2 to generate a comparison signal SB4, a comparator 78 compares the feedback signal Vfb1 with a threshold VL1 to generate a comparison signal SB5, a controller 80 selects one of clock signals Clk1, Clk2, Clk3, Clk4 and Clk5 as the clock signal Clk provided to an up/down counter 44 according to the comparison signals SB1, SB2, SB3, SB4 and SB5 in the way that when the feedback signal Vfb1 is greater than the maximum threshold VH1 or smaller than the minimum threshold VL1, the controller 80 selects the clock signal Clk1 of the maximum frequency to provide to the up/down counter 44, the up/down counter 44 samples the comparison signal SB3 responsive to the clock signal Clk and increase or decrease the digital signal Sd by one bit according to the sampling result in the way that when the feedback signal Vfb1 is greater than the maximum threshold VH1 or smaller than the minimum threshold VL1, the up/down counter 44 decreases the digital signal Sd to a minimum value or increases the digital signal Sd to a maximum value immediately or at the maximum frequency responsive to the comparison signal SB 1 or SB5 so as to increase the slew rate of the third signal Vcomp, an oscillator 40 provides the clock signal Clk1 of a frequency f, a frequency divider 82 divides the frequency f of the clock signal Clk1 to generate the clock signal Clk2 of a frequency f/2, a frequency divider 84 divides the frequency f/2 of the clock signal Clk2 to generate the clock signal Clk3 of a frequency f/4, a frequency divider 86 divides the frequency f/4 of the clock signal Clk3 to generate the clock signal Clk4 of a frequency f/8, and a frequency divider 88 divides the frequency f/8 of the clock signal Clk4 to generate the clock signal Clk5 of a frequency f/16. In this mixed mode compensation circuit, the characteristic curve of the voltage variation rate dVa1/dt of the first signal Va1 of the DAC 24 versus the input voltage Vfb1 of the digital signal generator 22 is as shown FIG. 9.

In FIG. 10, the LPF 28 includes a low-bandwidth operational amplifier 90 having a non-inverting input terminal to receive the second signal Va2 from the offset injector 26 and an inverting input terminal connected to the output terminal Vcomp of the LPF 28, a resistor R5 and a compensation capacitor C3 serially connected between the output terminal of the operational amplifier 90 and the output terminal Vcomp of the LPF 28 to stabilize the third signal Vcomp, a transistor M5 connected between a power terminal Vcc and the output terminal Vcomp of the LPF 28 and having a gate connected to the output terminal of the operational amplifier 90, and a resistor R6 connected between the output terminal Vcomp of the LPF 28 and a ground terminal GND.

Figure 11:
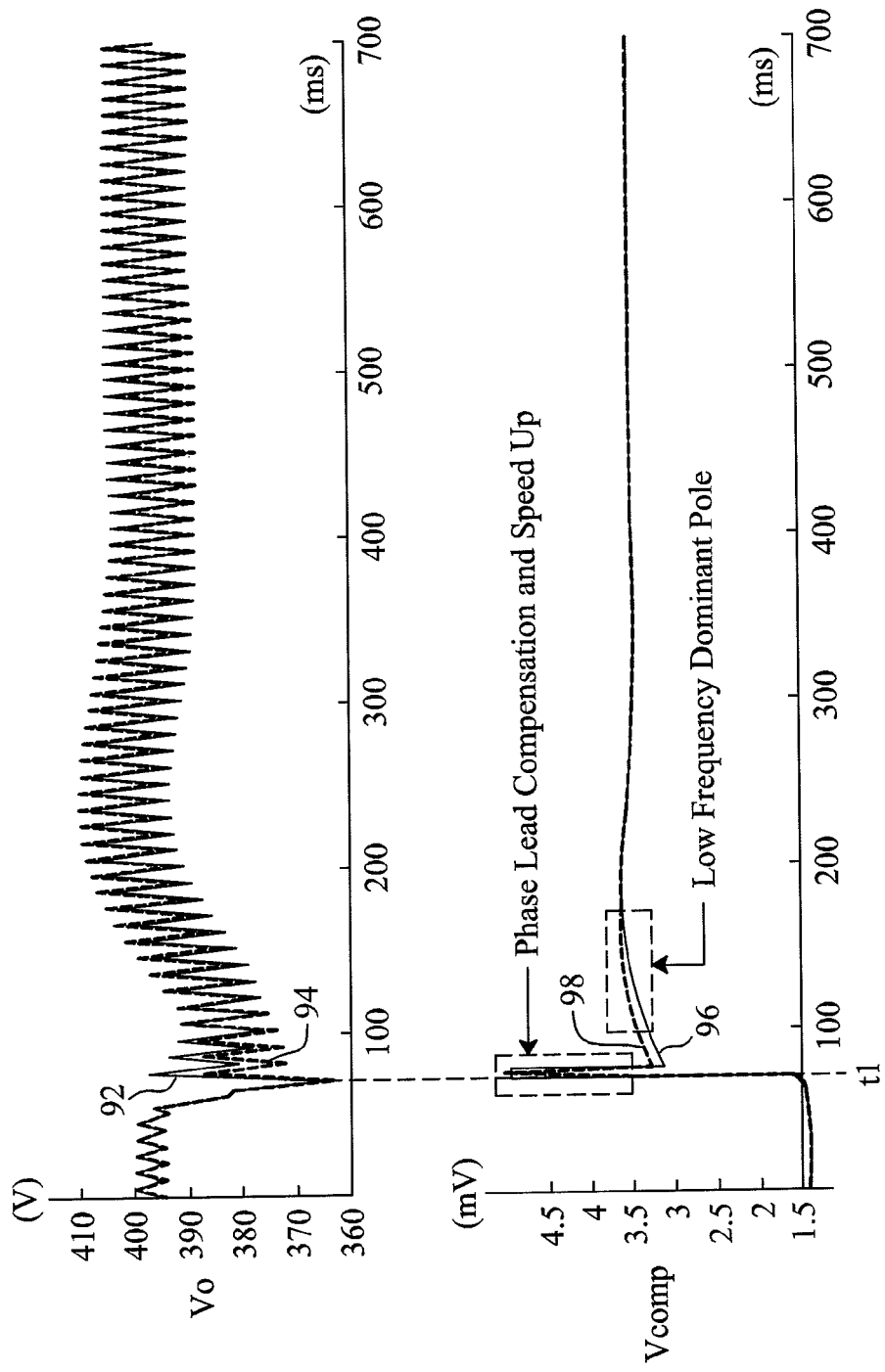
FIG. 11 shows the output voltages of the power converter and the signals Vcomp that are generated by using the gm type analog compensation circuit shown in FIG. 2 and the mixed mode compensation circuit according to the present invention, respectively.

FIG. 11 illustrates the effect of the present invention, in which waveforms 92 and 96 are the output voltage V0 of a power converter and the signal Vcomp, respectively, that are generated by using the gm type analog compensation circuit 14 shown in FIG. 2, while waveforms 94 and 98 are the output voltage V0 of a power converter and the third signal Vcomp, respectively, that are generated by using the mixed mode compensation circuit 20 of the present invention, and are almost the same as the waveforms 92 and 96 generated by using the gm type analog compensation circuit 14. Moreover, when a load transient occurs at time t1, the mixed mode compensation circuit 20 also has a good transient response.

Therefore, the mixed mode compensation circuit 20 can indeed replace the conventional analog compensation circuit 14. The mixed mode compensation circuit 20 can reduce the frequency of the clock signal Clk to achieve the same effect of stabilizing the signal Vcomp as that provided by large capacitors C1 and C2 in the analog compensation circuit 14, and thus the mixed mode compensation circuit 20 needs not use large capacitors C1 and C2, so it can be easily integrated into a control IC to reduce the number of the pins. Due to combining an analog circuit and a digital circuit together, the mixed mode compensation circuit 20 is simpler and thereby occupies a smaller chip area, and eliminates the need for a complex DSP algorithm as compared to the digital compensation circuit. This can simplify the design and reduce the costs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A mixed mode compensation circuit for a power converter, comprising:
   a digital signal generator generating a digital signal according to a reference value and a feedback signal which is related to an output voltage of the power converter;
   a digital-to-analog converter connected to the digital signal generator, converting the digital signal into a first analog signal;
   an offset injector connected to the digital-to-analog converter, providing a variable offset value determined by a difference between the feedback signal and the reference value to offset the first analog signal to generate a second analog signal; and
   a low-pass filter connected to the offset injector, configured to filter out high-frequency components of the second analog signal to generate a third analog signal for the power converter to stabilize the output voltage.

2. The mixed mode compensation circuit of claim 1, wherein the digital signal generator comprises:
   a comparator comparing the feedback signal with the reference value to generate a comparison signal;
   a controller connected to the comparator, responsive to a clock signal to sample the comparison signal to determine a control signal; and
   an up/down counter connected to the controller, configured to provide the digital signal and sample the control signal responsive to the clock signal to adjust the digital signal.

3. The mixed mode compensation circuit of claim 2, further comprising:
   a second comparator connected to the controller, configured to assert a second comparison signal for the controller when the feedback signal is greater than a first threshold; and
   a third comparator connected to the controller, configured to assert a third comparison signal for the controller when the feedback signal is smaller than a second threshold;
   wherein the controller controls the up/down counter to immediately decrease the digital signal to a minimum value responsive to the second comparison signal, and to immediately increase the digital signal to a maximum value responsive to the third comparison signal.

4. The mixed mode compensation circuit of claim 2, further comprising:
   an oscillator connected to the controller, providing the clock signal; and
   an operational transconductance amplifier connected to the oscillator, amplifying the difference between the feedback signal and the reference value to generate a frequency adjustment signal for the oscillator to adjust a frequency of the clock signal;
   wherein the frequency of the clock signal is increased as the difference between the feedback signal and the reference value increases.

5. The mixed mode compensation circuit of claim 4, further comprising:
   a second comparator connected to the oscillator, configured to assert a second comparison signal for the oscillator when the feedback signal is greater than a first threshold; and
   a third comparator connected to the oscillator, configured to assert a third comparison signal for the oscillator when the feedback signal is smaller than a second threshold;
   wherein the oscillator increases the frequency of the clock signal to a maximum value responsive to the second comparison signal or the third comparison signal such that the digital signal is increased to a maximum value or decreased to a minimum value at a highest frequency.

6. The mixed mode compensation circuit of claim 1, wherein the digital signal generator comprises:
   a comparator comparing the feedback signal with a plurality of thresholds and the reference value one by one to generate a comparison signal;
   an oscillator providing a clock signal and adjusting a frequency of the clock signal responsive to a frequency adjustment signal;
   a multiplexer connected to the comparator, responsive to a plurality of pulse signals to switch the plurality of thresholds and the reference value in turn to an input terminal of the comparator in each period of the clock signal;
   a controller connected to the comparator and the oscillator, configured to determine a control signal and the frequency adjustment signal according to the comparison signal;
   an up/down counter connected to the controller and the oscillator, configured to provide the digital signal and sample the control signal responsive to the clock signal to adjust the digital signal; and
   a pulse generator connected to the oscillator and the multiplexer, responsive to the clock signal to generate the plurality of pulse signals for the multiplexer.

7. The mixed mode compensation circuit of claim 6, wherein the frequency of the clock signal is adjusted to a maximum value when the feedback signal is greater than a maximum one of the plurality of thresholds or smaller than a minimum one of the plurality of thresholds.

8. The mixed mode compensation circuit of claim 6, wherein the up/down counter immediately decreases the digital signal to a minimum value when the feedback signal is greater than a maximum one of the plurality of thresholds, and immediately increases the digital signal to a maximum value when the feedback signal is smaller than a minimum one of the plurality of thresholds.

9. The mixed mode compensation circuit of claim 6, wherein the up/down counter decreases the digital signal to a minimum value at a maximum frequency when the feedback signal is greater than a maximum one of the plurality of thresholds, and increases the digital signal to a maximum value at a maximum frequency when the feedback signal is smaller than a minimum one of the plurality of thresholds.

10. The mixed mode compensation circuit of claim 1, wherein the digital signal generator comprises:
   a first comparator comparing the feedback signal with the reference value to generate a first comparison signal;
   a plurality of second comparators, comparing the feedback signal with a plurality of thresholds, respectively, to generate a plurality of second comparison signals;
   a controller connected to the first comparator and the plurality of second comparators, configured to select one of a plurality of clock signals according to the first comparison signal and the plurality of second comparison signals; and
   an up/down counter connected to the first comparator and the controller, configured to provide the digital signal, sample the first comparison signal responsive to the selected clock signal by the controller, and adjust the digital signal according to a sampling result.

11. The mixed mode compensation circuit of claim 10, wherein the controller selects one of the plurality of clock signals that has a maximum frequency when the feedback signal is greater than a maximum one of the plurality of thresholds or smaller than a minimum one of the plurality of thresholds.

12. The mixed mode compensation circuit of claim 10, wherein the up/down counter immediately decreases the digital signal to a minimum value when the feedback signal is greater than a maximum one of the plurality of thresholds, and immediately increases the digital signal to a maximum value when the feedback signal is smaller than a minimum one of the plurality of thresholds.

13. The mixed mode compensation circuit of claim 10, wherein the up/down counter decreases the digital signal to a minimum value at a maximum frequency when the feedback signal is greater than a maximum one of the plurality of thresholds, and increases the digital signal to a maximum value at a maximum frequency when the feedback signal is smaller than a minimum one of the plurality of thresholds.

14. The mixed mode compensation circuit of claim 1, wherein the offset injector comprises:
   a resistor having a first terminal connected to the digital-to-analog converter and a second terminal connected to the low-pass filter, providing the variable offset value;
   a first current source configured to determine a first current varying with the difference between the feedback signal and the reference value;
   a first switch connected between the first current source and the first terminal of the resistor, controlled by a first control signal to apply the first current to the first terminal of the resistor;
   a second current source configured to determine a second current varying with the difference between the feedback signal and the reference value;
   a second switch connected between the second current source and the first terminal of the resistor, controlled by a second control signal to draw the second current from the first terminal of the resistor;
   a third current source configured to determine a third current varying with the difference between the feedback signal and the reference value;
   a third switch connected between the third current source and the second terminal of the resistor, controlled by the second control signal to apply the third current to the second terminal of the resistor;
   a fourth current source configured to determine a fourth current varying with the difference between the feedback signal and the reference value; and
   a fourth switch connected between the fourth current source and the second terminal of the resistor, controlled by the first control signal to draw the fourth current from the second terminal of the resistor.

15. The mixed mode compensation circuit of claim 1, wherein the offset injector comprises:
   a variable resistor providing the variable offset value, the variable resistor having a first terminal connected to the digital-to-analog converter, a second terminal connected to the low-pass filter, and a resistance varying with the difference between the feedback signal and the reference value;
   a first current source configured to determine a first constant current;
   a first switch connected between the first current source and the first terminal of the variable resistor, controlled by a first control signal to apply the first constant current to the first terminal of the variable resistor;
   a second current source configured to determine a second constant current;
   a second switch connected between the second current source and the first terminal of the variable resistor, controlled by a second control signal to draw the second constant current from the first terminal of the variable resistor;
   a third current source configured to determine a third constant current;
   a third switch connected between the third current source and the second terminal of the variable resistor, controlled by the second control signal to apply the third constant current to the second terminal of the variable resistor;
   a fourth current source configured to determine a fourth constant current; and
   a fourth switch connected between the fourth current source and the second terminal of the variable resistor, controlled by the first control signal to draw the fourth constant current from the second terminal of the variable resistor.

16. The mixed mode compensation circuit of claim 1, wherein the low-pass filter includes an RC filter established by a resistor and a capacitor.

17. The mixed mode compensation circuit of claim 1, wherein the low-pass filter comprises:
   a low-bandwidth operational amplifier having a first input terminal to receive the second analog signal from the offset injector, and a second input terminal connected to an output terminal of the low-pass filter;
   a first resistor and a compensation capacitor serially connected between an output terminal of the low-bandwidth operational amplifier and the output terminal of the low-pass filter;
   a transistor connected between a power terminal and the output terminal of the low-pass filter, and having a gate connected to the output terminal of the low-bandwidth operational amplifier; and
   a second resistor connected between the output terminal of the low-pass filter and a ground terminal.

18. A mixed mode compensation method for a power converter, comprising:
   A.) generating a digital signal according to a reference value and a feedback signal which is related to an output voltage of the power converter;
   B.) converting the digital signal into a first analog signal;

C.) providing a variable offset value determined by a difference between the feedback signal and the reference value;

D.) offsetting the first analog signal with the variable offset value to generate a second analog signal; and E.) filtering out high-frequency components of the second analog signal to generate a third analog signal for the power converter to stabilize the output voltage.

19. The mixed mode compensation method of claim 18, wherein the step A comprises:
   comparing the feedback signal with the reference value to generate a comparison signal;
   sampling the comparison signal responsive to a clock signal; and
   increasing or decreasing the digital signal according to the sampling result.

20. The mixed mode compensation method of claim 19, further comprising adjusting a frequency of the clock signal according to the difference between the feedback signal and the reference value.

21. The mixed mode compensation method of claim 20, further comprising adjusting the frequency of the clock signal to a maximum value when the feedback signal is greater than a first threshold or smaller than a second threshold.

22. The mixed mode compensation method of claim 20, further comprising:
   decreasing the digital signal to a minimum value at a maximum frequency of the clock signal when the feedback signal is greater than a first threshold; and
   increasing the digital signal to a maximum value at the maximum frequency of the clock signal when the feedback signal is smaller than a second threshold.

23. The mixed mode compensation method of claim 19, further comprising:
   comparing the feedback signal with a plurality of thresholds and the reference value one by one to generate a comparison signal; and
   adjusting a frequency of the clock signal according to the comparison signal.

24. The mixed mode compensation method of claim 23, further comprising adjusting the frequency of the clock signal to a maximum value when the feedback signal is greater than a maximum one of the plurality of thresholds or smaller than a minimum one of the plurality of thresholds.

25. The mixed mode compensation method of claim 23, further comprising:
   decreasing the digital signal to a minimum value at a maximum frequency of the clock signal when the feedback signal is greater than a maximum one of the plurality of thresholds; and
   increasing the digital signal to a maximum value at the maximum frequency of the clock signal when the feedback signal is smaller than a minimum one of the plurality of thresholds.

26. The mixed mode compensation method of claim 18, wherein the step A comprises:
   comparing the feedback signal with the reference value to generate a first comparison signal;
   comparing the feedback signal with a plurality of thresholds, respectively, to generate a plurality of second comparison signals;
   providing a plurality of clock signals;
   selecting one of the plurality of clock signals according to the first comparison signal and the plurality of second comparison signals;
   sampling the first comparison signal responsive to the selected clock signal; and
   increasing or decreasing the digital signal according to the sampling result.

27. The mixed mode compensation method of claim 26, further comprising selecting one of the plurality of clock signals that has a maximum frequency to sample the first comparison signal when the feedback signal is greater than a maximum one of the plurality of thresholds or smaller than a minimum one of the plurality of thresholds.

28. The mixed mode compensation method of claim 26, further comprising:
   decreasing the digital signal to a minimum value when the feedback signal is greater than a maximum one of the plurality of thresholds; and
   increasing the digital signal to a maximum value when the feedback signal is smaller than a minimum one of the plurality of thresholds.

29. The mixed mode compensation method of claim 18, further comprising:
   immediately decreasing the digital signal to a minimum value when the feedback signal is greater than a first threshold; and
   immediately increasing the digital signal to a maximum value when the feedback signal is smaller than a second threshold.

30. The mixed mode compensation method of claim 18, wherein the step C comprises applying a current varying with the difference between the feedback signal and the reference value to a resistor to generate the variable offset value.

31. The mixed mode compensation method of claim 18, wherein the step C comprises applying a current to a variable resistor to generate the variable offset value, the variable resistor having a resistance varying with the difference between the feedback signal and the reference value.

\* \* \* \* \*